(12) United States Patent
Johnson et al.

(10) Patent No.: US 9,840,998 B2
(45) Date of Patent: Dec. 12, 2017

(54) SYSTEM AND METHOD FOR CONTROLLING FUEL INJECTION CHARACTERISTICS IN AN ENGINE

(71) Applicant: AVL Powertrain Engineering, Inc., Plymouth, MI (US)

(72) Inventors: Gustav R. Johnson, Canton, MI (US); Gary L. Hunter, Dexter, MI (US)

(73) Assignee: AVL POWERTRAIN ENGINEERING, INC., Plymouth, MI (US)

( * ) Notice: Subject to any disclaimer, the term of this patent is extended or adjusted under 35 U.S.C. 154(b) by 126 days.

(21) Appl. No.: 14/722,685

(22) Filed: May 27, 2015

(65) Prior Publication Data

US 2015/0354525 A1    Dec. 10, 2015

Related U.S. Application Data

(60) Provisional application No. 62/010,061, filed on Jun. 10, 2014.

(51) Int. Cl.
*F02P 5/04* (2006.01)
*F02D 41/38* (2006.01)
*F02D 41/40* (2006.01)

(52) U.S. Cl.
CPC .......... *F02P 5/045* (2013.01); *F02D 41/3809* (2013.01); *F02D 41/3836* (2013.01); *F02D 41/40* (2013.01); *Y02T 10/44* (2013.01)

(58) Field of Classification Search
CPC .. F02D 35/023; F02D 41/3827; F02D 41/401; F02D 35/028; F02D 35/026;
(Continued)

(56) References Cited

U.S. PATENT DOCUMENTS 4,621,603 A * 11/1986 Matekunas ........... F02D 35/023
                                                                        123/435
4,622,939 A * 11/1986 Matekunas ........... F02D 35/023
                                                                        123/406.41
(Continued)

FOREIGN PATENT DOCUMENTS

EP    2275661 A1    1/2011
GB    2498784 A    7/2013

OTHER PUBLICATIONS

Extended European Search Report and Written Opinion for Application No. 15170517.5, dated Dec. 2, 2015.

*Primary Examiner* — Erick Solis
*Assistant Examiner* — Anthony L Bacon
(74) *Attorney, Agent, or Firm* — Harness, Dickey & Pierce, P.L.C.

(57) ABSTRACT

An engine control system includes first and second control modules. The first control module determines a fuel combustion parameter. The second control module determines a fuel delivery parameter based on the fuel combustion parameter. The fuel combustion parameter includes at least one of (i) a total amount of heat released by a volume of fuel during a combustion cycle and (ii) a rate at which heat is released during the combustion cycle. The fuel delivery parameter includes at least one of (i) a duration of time over which the volume of fuel is delivered to a cylinder, (ii) a time at which a fuel injector starts delivering the volume of fuel to the cylinder, and (iii) a fuel pressure in a fuel rail.

18 Claims, 2 Drawing Sheets

(58) Field of Classification Search
CPC .. F02D 41/3809; F02D 41/3836; F02D 41/40; F02D 41/38; Y02T 10/44; F02P 5/045
See application file for complete search history.

(56) References Cited

U.S. PATENT DOCUMENTS

| | | | | |
|---|---|---|---|---|
| 4,624,229 A * | 11/1986 | Matekunas | ............ | F02D 35/023 123/406.41 |
| 4,976,241 A * | 12/1990 | Ishida | ............ | F02P 5/1455 123/406.32 |
| 5,050,556 A * | 9/1991 | Williams | ............ | F02D 35/022 123/406.28 |
| 6,230,683 B1 * | 5/2001 | zur Loye | ............ | F02B 1/12 123/27 GE |
| 6,276,334 B1 * | 8/2001 | Flynn | ............ | F02B 19/14 123/435 |
| 6,286,482 B1 * | 9/2001 | Flynn | ............ | F02B 1/12 123/25 C |
| 6,711,945 B2 * | 3/2004 | Fuerhapter | ............ | F02B 1/12 73/114.01 |
| 7,334,561 B2 * | 2/2008 | Neunteufl | ............ | F02B 1/00 123/295 |
| 7,920,956 B2 * | 4/2011 | Hillion | ............ | F02D 41/345 123/435 |
| 8,301,356 B2 * | 10/2012 | Wang | ............ | F02D 35/026 123/435 |
| 8,434,456 B2 * | 5/2013 | Fischer | ............ | F02D 35/023 123/305 |
| 8,437,945 B2 * | 5/2013 | Haskara | ............ | F02D 35/023 123/299 |
| 8,463,531 B2 * | 6/2013 | Ramappan | ............ | F02D 35/028 123/568.21 |
| 8,528,521 B2 * | 9/2013 | Landsmann | ............ | F02D 35/023 123/435 |
| 8,676,471 B2 * | 3/2014 | Catanese | ............ | F02D 35/023 123/435 |
| 8,831,856 B2 * | 9/2014 | Yasuda | ............ | F02D 35/028 123/435 |
| 8,849,549 B2 * | 9/2014 | Jin | ............ | F02D 41/1498 701/111 |
| 8,918,265 B2 * | 12/2014 | Kang | ............ | F02D 41/14 701/102 |
| 9,008,944 B2 * | 4/2015 | Wermuth | ............ | F02D 35/02 701/102 |
| 9,200,583 B2 * | 12/2015 | Jiang | ............ | F02D 13/0215 |
| 2005/0229903 A1 | 10/2005 | Kobayashi et al. | | |
| 2007/0294022 A1 * | 12/2007 | Sameshima | ............ | F02B 31/06 701/102 |
| 2008/0162017 A1 * | 7/2008 | Nagata | ............ | F02D 35/02 701/103 |
| 2009/0151692 A1 * | 6/2009 | He | ............ | F02D 35/023 123/299 |
| 2009/0182485 A1 * | 7/2009 | Loeffler | ............ | F02D 35/023 701/103 |
| 2009/0266336 A1 * | 10/2009 | Morimoto | ............ | F02D 35/023 123/406.47 |
| 2009/0292447 A1 * | 11/2009 | Yamaguchi | ............ | F02D 35/023 701/103 |
| 2009/0299605 A1 * | 12/2009 | Kweon | ............ | F02D 19/0628 701/103 |
| 2010/0031924 A1 * | 2/2010 | Sun | ............ | F02B 1/12 123/435 |
| 2010/0043751 A1 | 2/2010 | Kweon et al. | | |
| 2011/0160982 A1 * | 6/2011 | Kumar | ............ | F02D 41/0025 701/103 |
| 2011/0168129 A1 * | 7/2011 | Kurtz | ............ | F02D 19/061 123/294 |
| 2011/0288747 A1 * | 11/2011 | Wermuth | ............ | F02B 17/005 701/103 |
| 2012/0239275 A1 * | 9/2012 | Hoshi | ............ | F02D 41/1497 701/103 |
| 2013/0024089 A1 * | 1/2013 | Wang | ............ | F02D 41/1462 701/102 |
| 2013/0046453 A1 * | 2/2013 | Cowgill | ............ | F02D 41/3094 701/104 |
| 2014/0109873 A1 * | 4/2014 | Allezy | ............ | F02D 41/403 123/435 |
| 2015/0275810 A1 * | 10/2015 | Tanaka | ............ | F02D 41/3035 701/105 |
| 2016/0115877 A1 * | 4/2016 | Daniels | ............ | F02D 35/025 701/103 |
| 2016/0123264 A1 * | 5/2016 | Oyagi | ............ | F02D 35/023 701/105 |

\* cited by examiner

SYSTEM AND METHOD FOR CONTROLLING FUEL INJECTION CHARACTERISTICS IN AN ENGINE

CROSS-REFERENCE TO RELATED APPLICATIONS

This application claims the benefit of U.S. Provisional Application No. 62/010,061, filed on Jun. 10, 2014. The entire disclosure of the above application is incorporated herein by reference.

FIELD

The present disclosure relates to an ignition control system and method for controlling various characteristics of fuel injection in an engine, and more specifically to a system and method for controlling fuel injection rate, fuel injection timing, quantity of fuel injected, and volumetric energy content of fuel injected in an engine.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Vehicles include an engine that generates power by combusting a mixture of fuel and air in a cylinder. The fuel is supplied to the cylinder by a fuel injector. The energy and power from combustion are transmitted to a crankshaft through at least one piston. The crankshaft may have various angular positions during the injection and combustion process. Engine control systems have been developed to adjust the timing of injector operation (e.g., the start of injection) such that combustion timing can be controlled.

SUMMARY

This section provides a general summary of the disclosure and is not a comprehensive disclosure of its full scope or all of its features.

According to one aspect of the present disclosure, an engine control system if provided. The engine control system may include first and second control modules. The first control module may determine a fuel combustion parameter. The second control module may determine a fuel delivery parameter based on the fuel combustion parameter. The fuel combustion parameter may include at least one of (i) a total amount of heat released by a volume of fuel during a combustion cycle and (ii) a rate at which heat is released during the combustion cycle. The fuel delivery parameter may include at least one of (i) a duration of time over which the volume of fuel is delivered to a cylinder, (ii) a time at which a fuel injector starts delivering the volume of fuel to the cylinder, and (iii) a fuel pressure in a fuel rail.

According to another aspect of the present disclosure, a method is provided for controlling delivery of fuel to an engine including a crankshaft and a cylinder. The method may include determining a fuel combustion parameter. The fuel combustion parameter may include at least one of (i) a total amount of heat released by a volume of fuel during a combustion cycle and (ii) a rate at which the heat is released during the combustion cycle. The method may also include controlling a fuel delivery parameter based on the fuel combustion parameter. The fuel delivery parameter may include at least one of (i) a duration of time over which the volume of fuel is delivered to the cylinder, (ii) a time at which a fuel injector starts delivering the volume of fuel to the cylinder, and (iii) a fuel pressure in the fuel rail.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Example embodiments will now be described more fully with reference to the accompanying drawings.

Figure 1:
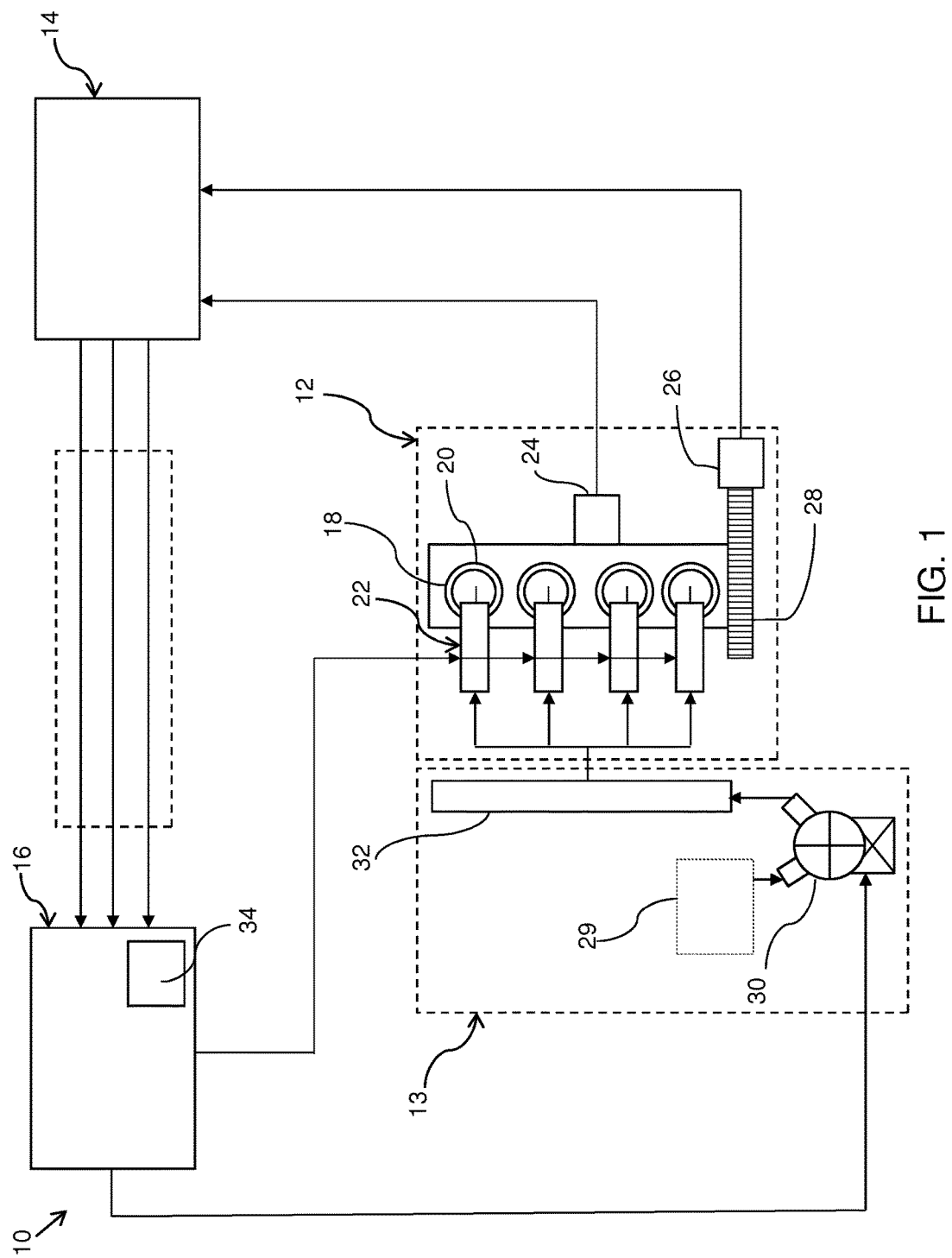
FIG. 1 is a functional block diagram illustrating a control system according to the principles of the present disclosure.

With reference to FIG. 1, a functional block diagram illustrates an engine control system 10 for optimizing the use of fuel in an engine 12. The engine control system 10 may include a first control module 14 and a second control module 16.

The engine 12 may provide power to a vehicle (not shown) by combusting a mixture of air and fuel (e.g., diesel, gasoline, natural gas) during a combustion cycle. The combustion cycle may be a two-stroke or a four-stroke cycle, including at least one stroke during which a fuel volume V_F is supplied to the engine 12, and at least one stroke during which at least a portion of the fuel volume V_F combusts in the engine 12. In this regard, the engine 12 may include a cylinder 18, a piston 20, an injector 22, a pressure sensor 24, and a position sensor 26. While the engine 12 is shown to include four cylinders 18, the engine may include greater or less than four cylinders 18. The piston 20 may be located within the cylinder 18 and may be coupled to a crankshaft 28 to rotate the crankshaft 28 and produce a drive torque for the vehicle. The injector 22 may be in fluid communication with the cylinder 18 to deliver fuel, including the fuel volume V_F, to the cylinder 18. The pressure sensor 24 may be positioned within at least one cylinder 18 to measure a pressure therein. The position sensor 26 may be coupled to the crankshaft 28 to measure an angular position thereof.

A fuel system 13 may be in fluid communication with the engine 12 and may include a fuel source 29, such as a fuel tank (not shown), a fuel pump 30, and a fuel rail 32. The fuel pump 30 is in fluid communication with the fuel source 29 to deliver fuel from the fuel source to the fuel rail 32. The fuel rail 32 is in fluid communication with the injector 22 to deliver fuel from the fuel pump 30 to the injector 22.

The first control module 14 may be in communication with at least one of the pressure sensor 24 and the position sensor 26 to control the second control module 16 for optimizing the use of fuel in the engine 12. In one configuration, the first control module 14 is a cylinder pressure (Cypress) data module (CDM). As will be described in more detail below, the first control module 14 may determine an angular position θ of the crankshaft 28 at which approximately fifty percent (50%) of the mass of the fuel volume V_F has been combusted in the cylinder 18. This angular position θ will be referred to as θ(50), herein. The first control module 14 also determines a total amount of energy Q released during the combustion of the fuel volume V_F in the cylinder 18. This total amount of energy will be referred to as Qtot, herein. The first control module 14 also determines a rate dQ at which heat is released at the time approximately fifty percent of the mass of fuel volume V_F has been combusted in the cylinder 18 (i.e., at the time of θ(50)). This rate of heat release will be referred to as dQ(50), herein.

While the angular position θ and rate dQ are described herein as corresponding to a time when approximately fifty percent of the mass of the fuel volume V_F has been combusted in the cylinder 18, the angular position θ and rate dQ may correspond to, and/or be determined at, other times, including times when more or less than fifty percent of the mass of the fuel volume V_F has been combusted in the cylinder 18.

The second control module 16 may be an engine control module (ECM), and may be in communication with the first control module 14, the fuel pump 30 and the injector 22. The second control module 16 may include a controller 34. In one configuration, the controller 34 is a proportional-integral-derivative (PID) controller. As will be described in more detail below, the second control module 16 may calculate a difference between θ(50), Qtot and dQ(50) relative to desired values of each. The differences between θ(50), Qtot and dQ(50) and the desired values of each may then be used to adjust the value or size of the fuel volume V_F, the timing of the operation of the injector 22, and/or the pressure in the fuel rail 32 in order, such that the fuel volume V_F and the rate dQ(50) are optimized or otherwise controlled. While the first and second control modules 14, 16 are shown and described herein as being physically distinct and separate components, the first and second control modules 14, 16 may be incorporated or otherwise integrated into a single module.

Figure 2:
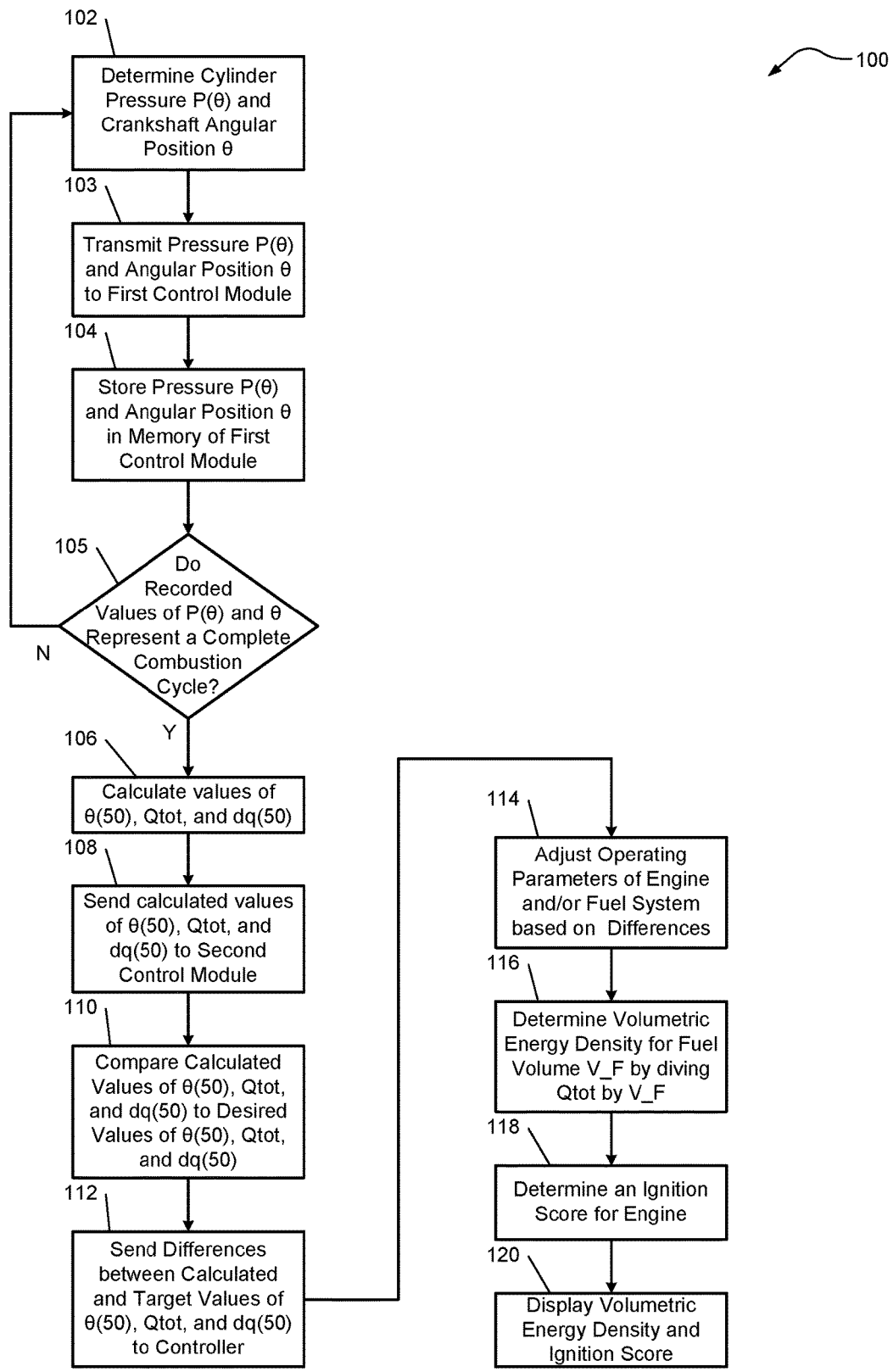
FIG. 2 is a flow diagram illustrating a method for controlling the use of fuel in an engine.

With reference to FIG. 2, a method 100 for operating and controlling the system 10 will now be described in detail. The method 100 includes controlling the timing of delivery of fuel from the injector 22 to the cylinder 18 (including a start time and a duration) and controlling a pressure of fuel in the fuel rail 32, in order to control and reduce the variability in performance of the engine 12 when a fuel property (e.g., cetane number, energy content, density, distillation property) that affects θ(50), Qtot and/or dQ(50) is varied.

A start of the method 100 and a control period is designated at 102, and includes determining a cylinder pressure P(θ) in at least one of the cylinders 18 with the pressure sensor 24, and determining an angular position θ of the crankshaft 28 with the position sensor 26. It will be appreciated that the pressure P(θ) may represent the pressure in the cylinder 18 when the angular position of the crankshaft 28 is equal to θ.

At 103, the pressure P(θ) and angular position θ are transmitted from the sensors 24 and 26, respectively, to the first control module 14. At 104, the pressure P(θ) and angular position θ are stored in a memory (e.g., RAM) of the first control module 14. In one configuration, the pressure P(θ) and angular position θ are transmitted to, and stored in, the first control module 14 at a predetermined or preprogrammed frequency, such as approximately twenty thousand times per second (20,000/s). Accordingly, as the speed of the engine 12 changes, the number of pressure P(θ) and angular position θ measurements taken and/or recorded during a combustion cycle will also change. Thus, the pressure P(θ) and angular position θ may be transmitted to, and stored in, the first control module 14 greater or less than approximately twenty thousand times per second.

At 105, the first control module 14 determines whether the recorded values for the cylinder pressure P(θ) and the angular position θ represent a complete combustion cycle within one of the respective cylinders 18 of the engine 12. If the recorded values for the cylinder pressure P(θ) and the angular position θ do not represent a complete combustion cycle of the respective cylinder 18, the process returns to step 102 and proceeds as described above.

If the recorded values for the cylinder pressure P(θ) and the angular position θ recorded at 104 represent a complete combustion cycle of the respective cylinder 18, the process proceeds to step 106, where the first control module 14 calculates θ(50), Qtot, and dq(50) for the respective cylinder 20 using the pressure P(θ), the volume V(θ), the angular position θ values determined at 102, as well as data that is representative of the geometry of the engine 12 (e.g., dimensions of the cylinder 18) and various thermodynamic constants. In this regard, the rate of heat release dq(50) may be calculated with the following equation:

$$dQ(\theta) = C_P \times P(\theta_i) \times [V(\theta_i) - V(\theta_{i-1})] + C_V \times V(\theta_i) \times [P(\theta_i) - P(\theta_{i-1})]$$

θ_i=a current angular position of the crankshaft 28
θ_{i-1}=a previous angular position of the crankshaft 28
V=a volume of the cylinder 18 at a given angular position θ of the crankshaft 28
P=a pressure in the cylinder 18 at a given angular position θ of the crankshaft 28
$C_P$=the thermodynamic specific heat of combustion at a constant pressure P
$C_V$=the thermodynamic specific heat of combustion at a constant volume V The volume V(θ) of the cylinder 18, as well as the thermodynamic specific heats $C_P$ and $C_V$ of the fuel mixture, can be preprogrammed into the first control module 14.

The total amount of heat released Qtot during a combustion cycle of the respective cylinder 18 may be calculated with the following equation:

$$Q\_TOT = \int [C_P \times P(\theta_i) \times [V(\theta_i) - V(\theta_{i-1})] + C_V \times V(\theta_i) \times [P(\theta_i) - P(\theta_{i-1})] C_P]$$

The angular position θ(50) of the crankshaft 28 at which at least approximately fifty percent of the mass of the fuel volume V_F has been combusted in the cylinder 18 may be calculated by determining the angular position θ at which an amount of heat released Q during the combustion cycle is equal to approximately one-half of Qtot.

At 108, the first control module 14 sends or otherwise communicates the θ(50), Qtot, and dq(50) values to the second control module 16. In one configuration, the first control module 14 sends the θ(50), Qtot, and dq(50) values to the second control module 16 over a controller area network (CAN) vehicle bus. It will also be appreciated, however, that the first control module 14 may send the θ(50), Qtot, and dq(50) values to the second control module 16 over other wired or wireless communication networks within the scope of the present disclosure.

At 110, the second control module 16 compares the θ(50), Qtot, and dq(50) values to predetermined desired values for each of θ(50), Qtot, and dq(50), respectively. The predetermined desired values for each of θ(50), Qtot, and dq(50) are referred to herein as θ(Target), Qtot(Target), and dq(Target), respectively. The second control 16 module may compare θ(50), Qtot, and dq(50) to θ(Target), Qtot(Target), and dq(Target), respectively, by finding the error or difference with the following equations:

$$\Delta_\theta = \theta(50) - \theta(\text{Target})$$

$$\Delta_{Qtot} = Qtot - Q(\text{Target})$$

$$\Delta_{dQ(50)} = dq(50) - dq(\text{Target})$$

At 112, the second control module 16 may send or otherwise communicate the error or difference between the values θ(50), Qtot, and dq(50) and the values θ(Target), Qtot(Target), and dq(Target), respectively, to the controller 34.

The controller 34 may simultaneously adjust multiple operating parameters of the engine 12 and/or fuel system 13 at 114, based on the error or difference between the values θ(50), Qtot, and dq(50) and the values θ(Target), Qtot(Target), and dq(Target), respectively, and based on at least one additional variable (e.g., predetermined values of the start time of the injector 22, the volume V_F of fuel provided by the injector 22, and/or a fuel pressure in the fuel rail 32). For example, the controller 34 may adjust the time at which the injector 22 begins sending fuel to the cylinder 18 based on the difference between θ(50) and θ(Target) and based on a predetermined or pre-programmed start time of the injector 22. By way of an additional example, the controller 34 may adjust the duration of time over which the injector 22 sends fuel to the cylinder 18 based on the difference between Qtot and Q(Target) and based on a predetermined or pre-programmed volume of fuel V_F sent by the injector 22 to the cylinder 18. By way of yet another example, the controller 34 may adjust the fuel pump 30 to control the fuel pressure in the fuel rail 32 based on the difference between dq(50) and dq(Target) and based on a predetermined or pre-programmed fuel pressure in the fuel rail 32.

In one configuration, the controller 34 may adjust a volume metering valve (not shown) in the fuel pump 30 to control the fuel pressure in the fuel rail 32. In this way, the controller 34 may reduce the difference or error between the values θ(50), Qtot, and dq(50) and the values θ(Target), Qtot(Target), and dq(Target), respectively, to zero.

At 116, the second control module 16 may determine a volumetric energy density for the fuel volume V_F by dividing Qtot by the value of V_F. At 118, the second control module 16 may determine an ignition score for the engine 12. The ignition score may be calculated by determining an average of the difference between θ(50) and θ(Target) over an extended time frame. For example, the difference between θ(50) and θ(Target) may be averaged over approximately a thirty second time frame. At 120, the second control module 16 may send or otherwise communicate the volumetric energy density and the ignition score to a display for reference by an operator of the vehicle. In particular, at 120, the second control module 16 may activate a display to display the ignition score to the operator of the vehicle.

While the second control module 16 is described herein as including a single controller 34, it will also be appreciated that the second control module 16 may include more than one controller 34 within the scope of the present disclosure. The controller 34 may adjust at least one of the start time of the injector 22, the duration of operation of the injector 22, and/or the fuel pressure in the fuel rail 32 based on a first set of values θ(50), Qtot, and dq(50), while another controller (not shown) may adjust at least one of the start time of the injector 22, the duration of operation of the injector 22, and/or the fuel pressure in the fuel rail 32 based on a second set values θ(50), Qtot, and dq(50).

The first set of values θ(50), Qtot, and dq(50) may be stored in a volatile memory. In this regard, the first set of values θ(50), Qtot, and dq(50) may be deleted or restarted each time the controller 34 is restarted, such as when the engine 12 is turned off. The second set of values θ(50), Qtot, and dq(50) may be stored in a long-term or non-volatile memory. In this regard, the second set of values θ(50), Qtot, and dq(50) may be saved in the non-volatile memory when the controller 34 or the other controller is turned off and/or restarted. Accordingly, the controller 34 or the other controller may use the second set of values θ(50), Qtot, and dq(50) to adjust the time at which the injector 22 begins sending fuel to the cylinder 18, the duration of time over which the injector 22 sends fuel to the cylinder 18, and/or the fuel pressure in the fuel rail 32 based on long-term operating parameters or variables of the engine 12.

By way of example only, the controller 34 or the other controller may use the first set of values θ(50), Qtot, and dq(50) to respond to fast-changing operating parameters such as ambient temperature or operator input, and may use the second set of values θ(50), Qtot, and dq(50) to respond to slow-changing operating parameters such as changing fuel characteristics (e.g., cetane numbers, energy content, density, distillation property). Accordingly, the system 10, including the first and second control modules 14, 16, may help to ensure consistent performance of the engine 12 even when the engine 12 is exposed to changing variables such as fuel quality, operator demand, and environmental characteristics.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. §112(f) unless an element is expressly recited using the phrase "means for," or in the case of a method claim using the phrases "operation for" or "step for."

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

What is claimed is:

1. An engine control system for an engine having a crankshaft, a cylinder configured to combust a volume of fuel during a combustion cycle, and a fuel rail configured to deliver the volume of fuel to the cylinder, the engine control system comprising:
    a first control module that determines a fuel combustion parameter, the fuel combustion parameter including at least one of (i) a total amount of heat released by the volume of fuel during the combustion cycle and (ii) a rate at which heat is released during the combustion cycle; and
    a second control module that:
        controls a first one of at least two fuel delivery parameters based on a difference between (i) the total amount of heat released by the volume of fuel during the combustion cycle and (ii) a target heat release amount; and
        controls a second one of the at least two fuel delivery parameters based on a difference between (i) the rate at which heat is released during the combustion cycle and (ii) a target rate of heat release, wherein the at least two fuel delivery parameters include at least two of (i) a duration of time over which the volume of fuel is delivered to the cylinder, (ii) a time at which a fuel injector starts delivering the volume of fuel to the cylinder, and (iii) a fuel pressure in the fuel rail.

2. The system of claim 1, wherein the second control module is configured to control the duration of time over which the volume of fuel is delivered to the cylinder based on the difference between (i) the total amount of heat released by the volume of fuel during the combustion cycle and (ii) the target heat release amount.

3. The system of claim 1, wherein the second control module is configured to control the fuel pressure in the fuel rail based on the difference between (i) the rate at which heat is released during the combustion cycle and (ii) the target rate of heat release.

4. The system of claim 1, wherein at least one of the first control module and the second control module is configured to determine an angular position of the crankshaft at which a predetermined amount of the volume of fuel has been combusted.

5. The system of claim 4, wherein the second control module is configured to control a third one of the at least two fuel delivery parameters based on a difference between (i)

the angular position of the crankshaft at which the predetermined amount of the volume of fuel has been combusted and (ii) a target angular position of the crankshaft.

6. The system of claim 5, wherein the second control module:
  determines an ignition score based on the difference between (i) the angular position of the crankshaft at which the predetermined amount of the volume of fuel has been combusted and (ii) the target angular position of the crankshaft; and
  activates a display to display the ignition score to a vehicle operator.

7. The system of claim 1, wherein the fuel combustion parameter is determined based on (i) a pressure within the cylinder and (ii) an angular position of the crankshaft.

8. The system of claim 1, wherein the second control module:
  determines a volumetric energy density for the volume of fuel based on the fuel combustion parameter; and
  activates a display to display the volumetric energy density to a vehicle operator.

9. A method for controlling delivery of fuel to an engine including a crankshaft and a cylinder, the method comprising:
  determining a fuel combustion parameter that includes at least one of (i) a total amount of heat released by a volume of fuel during a combustion cycle and (ii) a rate at which heat is released during the combustion cycle;
  controlling a first one of at least two fuel delivery parameters based on a difference between (i) the total amount of heat released by the volume of fuel during the combustion cycle and (ii) a target heat release amount; and
  controlling a second one of the at least two fuel delivery parameters based on a difference between (i) the rate at which heat is released during the combustion cycle and (ii) a target rate of heat release, wherein the at least two fuel delivery parameters include at least two of (i) a duration of time over which the volume of fuel is delivered to the cylinder, (ii) a time at which a fuel injector starts delivering the volume of fuel to the cylinder, and (iii) a fuel pressure in a fuel rail.

10. The method of claim 9, further comprising controlling the duration of time over which the volume of fuel is delivered to the cylinder based on the difference between (i) the total amount of heat released by the volume of fuel during the combustion cycle and (ii) the target heat release amount.

11. The method of claim 9, further comprising controlling the fuel pressure in the fuel rail based on the difference between (i) the rate at which heat is released during the combustion cycle and (ii) the target rate of heat release.

12. The method of claim 9, further comprising controlling an angular position of the crankshaft at which a predetermined amount of the volume of fuel has been combusted.

13. The method of claim 12, further comprising controlling a third one of the at least two fuel delivery parameters based on a difference between (i) the angular position of the crankshaft at which the predetermined amount of the volume of fuel has been combusted and (ii) a target angular position of the crankshaft.

14. The method of claim 13, further comprising:
  determining an ignition score based on the difference between (i) the angular position of the crankshaft at which the predetermined amount of the volume of fuel has been combusted and (ii) the target angular position of the crankshaft; and
  activating a display to display the ignition score to a vehicle operator.

15. The method of claim 9, further comprising determining the fuel combustion parameter based on (i) a pressure within the cylinder and (ii) an angular position of the crankshaft.

16. The method of claim 9, further comprising determining a volumetric energy density for the volume of fuel based on the fuel combustion parameter.

17. An engine control system for an engine having a crankshaft, a cylinder configured to combust a volume of fuel during a combustion cycle, and a fuel rail configured to deliver the volume of fuel to the cylinder, the engine control system comprising:
  a first control module that determines a fuel combustion parameter, the fuel combustion parameter including at least one of (i) a total amount of heat released by the volume of fuel during the combustion cycle and (ii) a rate at which heat is released during the combustion cycle; and
  a second control module that controls a fuel delivery parameter based on the fuel combustion parameter, the fuel delivery parameter including at least one of (i) a duration of time over which the volume of fuel is delivered to the cylinder, (ii) a time at which a fuel injector starts delivering the volume of fuel to the cylinder, and (iii) a fuel pressure in the fuel rail,
  wherein the first control module:
    stores in a volatile memory a first set of values corresponding to the fuel combustion parameter; and
    stores in a non-volatile memory a second set of values corresponding to the fuel combustion parameter, and
  wherein the second control module:
    controls the fuel delivery parameter based on the first set of values of the fuel combustion parameter when responding to a first operating parameter of the engine; and
    controls the fuel delivery parameter based on the second set of values of the fuel combustion parameter when responding to a second operating parameter of the engine, wherein the first operating parameter of the engine includes at least one of an ambient temperature and an operator input, and the second operating parameter of the engine includes a fuel characteristic.

18. A method for controlling delivery of fuel to an engine including a crankshaft and a cylinder, the method comprising:
  determining a fuel combustion parameter that includes at least one of (i) a total amount of heat released by a volume of fuel during a combustion cycle and (ii) a rate at which heat is released during the combustion cycle;
  controlling a fuel delivery parameter based on the fuel combustion parameter, the fuel delivery parameter including at least one of (i) a duration of time over which the volume of fuel is delivered to the cylinder, (ii) a time at which a fuel injector starts delivering the volume of fuel to the cylinder, and (iii) a fuel pressure in a fuel rail;
  storing in a volatile memory a first set of values corresponding to the fuel combustion parameter;
  storing in a non-volatile memory a second set of values corresponding to the fuel combustion parameter;
  controlling the fuel delivery parameter based on the first set of values of the fuel combustion parameter when responding to a first operating parameter of the engine; and controlling the fuel delivery parameter based on the second set of values of the fuel combustion parameter when responding to a second operating parameter of the engine, wherein the first operating parameter of the engine includes at least one of an ambient temperature and an operator input, and the second operating parameter of the engine includes a fuel characteristic.

\* \* \* \* \*